United States Patent
Son et al.

(10) Patent No.: US 7,190,939 B2
(45) Date of Patent: Mar. 13, 2007

(54) TIME DIVISION IQ CHANNEL DIRECT CONVERSION RECEIVER AND METHOD THEREFOR

(75) Inventors: Mi-hyun Son, Seoul (KR); Popov Oleg, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 460 days.

(21) Appl. No.: 10/654,606

(22) Filed: Sep. 4, 2003

(65) Prior Publication Data

US 2004/0116085 A1 Jun. 17, 2004

(30) Foreign Application Priority Data

Sep. 4, 2002 (KR) ............... 10-2002-0053161

(51) Int. Cl.
*H04B 1/06* (2006.01)
(52) U.S. Cl. .............. 455/258; 455/139; 455/148; 455/330; 455/231; 455/255; 455/324; 455/265; 375/322; 375/324; 375/329
(58) Field of Classification Search ............ 455/255, 455/257, 234.1, 205, 256, 258, 265, 231; 375/346, 322, 324, 329
See application file for complete search history.

(56) References Cited

U.S. PATENT DOCUMENTS

| 4,320,531 A | 3/1982 | Dimon |
| 4,321,549 A | 3/1982 | Hansen ............ 329/50 |
| 5,446,923 A | 8/1995 | Martinson et al. ......... 455/330 |
| 5,678,222 A | 10/1997 | Hornak et al. ............ 455/319 |
| 6,356,747 B1 | 3/2002 | Miquel et al. |
| 6,516,186 B1 * | 2/2003 | Yamagishi et al. ........ 455/302 |
| 6,639,447 B2 * | 10/2003 | Manku et al. ............ 327/359 |
| 6,731,917 B1 * | 5/2004 | Krishna .................... 455/205 |
| 6,853,838 B2 * | 2/2005 | Jones ..................... 455/234.1 |
| 6,950,641 B2 * | 9/2005 | Gu ........................ 455/241.1 |

FOREIGN PATENT DOCUMENTS

| EP | 0 896 424 A1 | 2/1999 |
| FR | 2 781 948 | 2/2000 |
| WO | WO 02/27952 A1 | 4/2002 |

* cited by examiner

*Primary Examiner*—Edward F. Urban
*Assistant Examiner*—Richard Chan
(74) *Attorney, Agent, or Firm*—Lee & Morse, P.C.

(57) ABSTRACT

A direct conversion receiver includes a local oscillator for generating a sinusoid, a mixer for receiving an incoming signal and for mixing the incoming signal with the sinusoid, an analog-to-digital converter for converting the mixed analog signal into a digital signal, and a digital signal processor for outputting the digital signal so that an I-channel signal and a Q-channel signal are output separately and for transmitting to the local oscillator a phase control signal that determines the phase of a sinusoid to be generated by the local oscillator. The direct conversion receiver may further include a low noise amplifier for amplifying the incoming while preventing noise included in the input signal from being amplified, a baseband amplifier for amplifying the mixed analog signal in a baseband, and a baseband low pass filter for removing low frequency noise from a signal amplified by the baseband amplifier.

26 Claims, 6 Drawing Sheets

TIME DIVISION IQ CHANNEL DIRECT CONVERSION RECEIVER AND METHOD THEREFOR

BACKGROUND OF THE INVENTION

1. Field of the Invention

The present invention relates to a receiver of a wireless communication terminal working in a wireless communication environment. More particularly, the present invention relates to a direct conversion receiver adopting direct conversion and a direct conversion reception method.

2. Description of the Related Art

In general, heterodyne-type receivers have been used in mobile phones, such as cellular phones or personal communication service (PCS) phones, and wireless phones that provide wireless communications.

Figure 1:
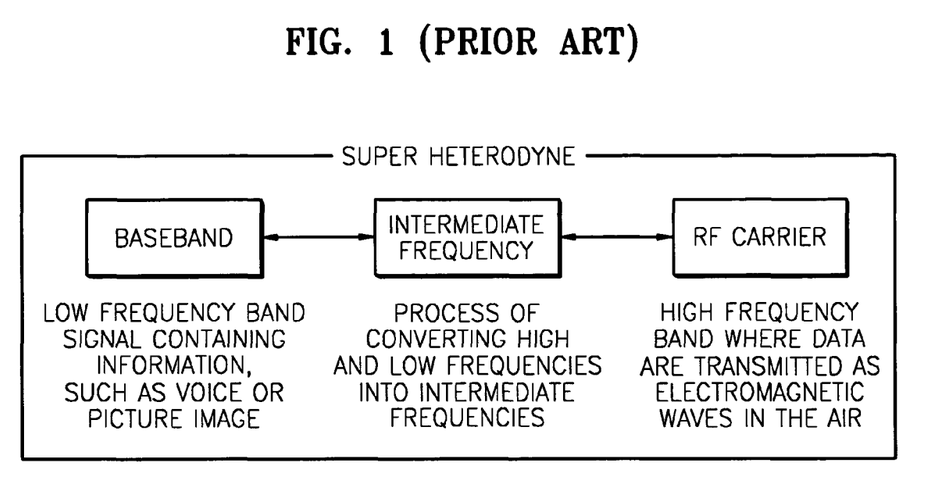
FIG. 1 is a diagram illustrating a conventional super heterodyne method.

FIG. 1 is a diagram illustrating a conventional super heterodyne method where a low frequency signal containing data, such as voice or image data, is converted into an intermediate frequency signal and then the intermediate frequency signal is transmitted on a radio-frequency (RF) carrier. A super heterodyne receiver adopting the super heterodyne method is required to include a frequency converter for converting an RF signal into an intermediate frequency signal, a frequency converter for converting the intermediate frequency signal into a baseband signal, and a band pass filter for processing signals in different frequency bands.

Extensive research has been performed on wireless communication terminals in an effort to solve such disadvantages of a heterodyne receiver. Resultantly, an alternative to the heterodyne receiver has been developed. The alternative is a receiver adopting a direction conversion method.

Figure 2:
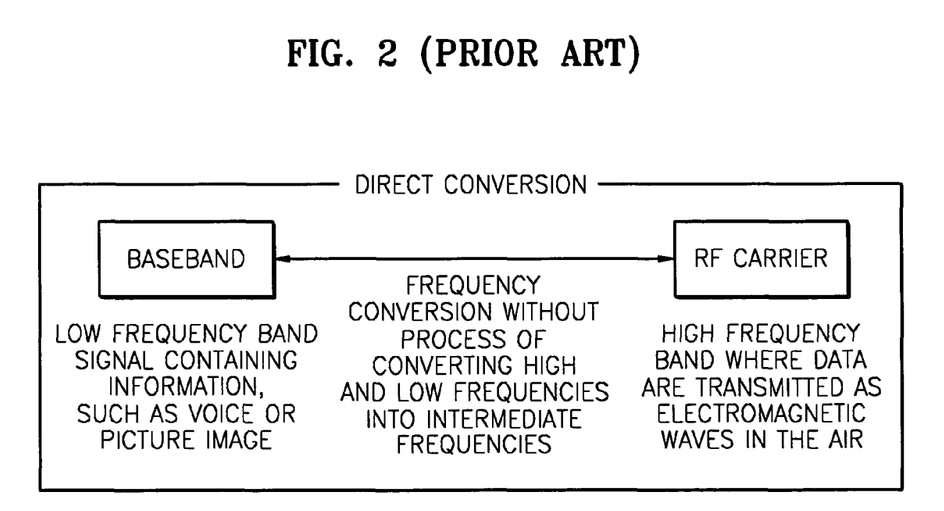
FIG. 2 is a diagram illustrating a conventional direct conversion receiving method.

FIG. 2 is a diagram illustrating a conventional direct conversion method where a low frequency signal containing data, such as voice or image data, is directly transmitted on an RF carrier without being converted into an intermediate frequency signal. A direct conversion receiver adopting the direct conversion receiving method enables a local oscillator to operate at the same frequency as that of an RF signal input thereinto via an antenna and converts an RF signal into a baseband signal without a process of converting the RF signal into an intermediate frequency signal.

Figure 3:
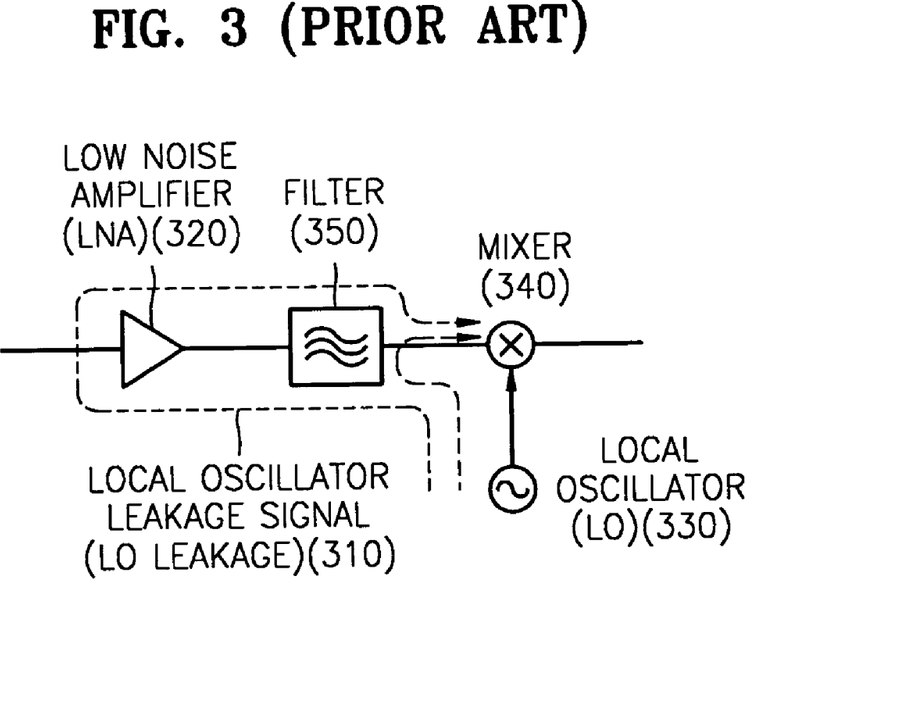
FIG. 3 is a circuit diagram illustrating a leakage signal of a local oscillator according to the prior art.

FIG. 3 is a diagram illustrating a leakage signal generated in a local oscillator according to the prior art. Referring to FIG. 3, during a decreasing of the frequency of an RF signal to a baseband level, there exists a moment when a local oscillator (LO) 330 has a same frequency as that of the RF signal. At this moment, frequency leakage 310 not associated with any kind of signal may occur in the local oscillator 330. In particular, when a leakage signal of the local oscillator 330, which has been amplified through a low noise amplifier (LNA) 320, is mixed with the original frequency of the local oscillator 330 in a mixer 340, a DC signal having an arbitrary value is output. Even though there exists a filter 350 between the low noise amplifier 320 and the mixer 340, there is a limit in reducing such frequency leakage in the local oscillator 330 because the local oscillator 330 has the same frequency as that of the RF signal.

Figure 4:
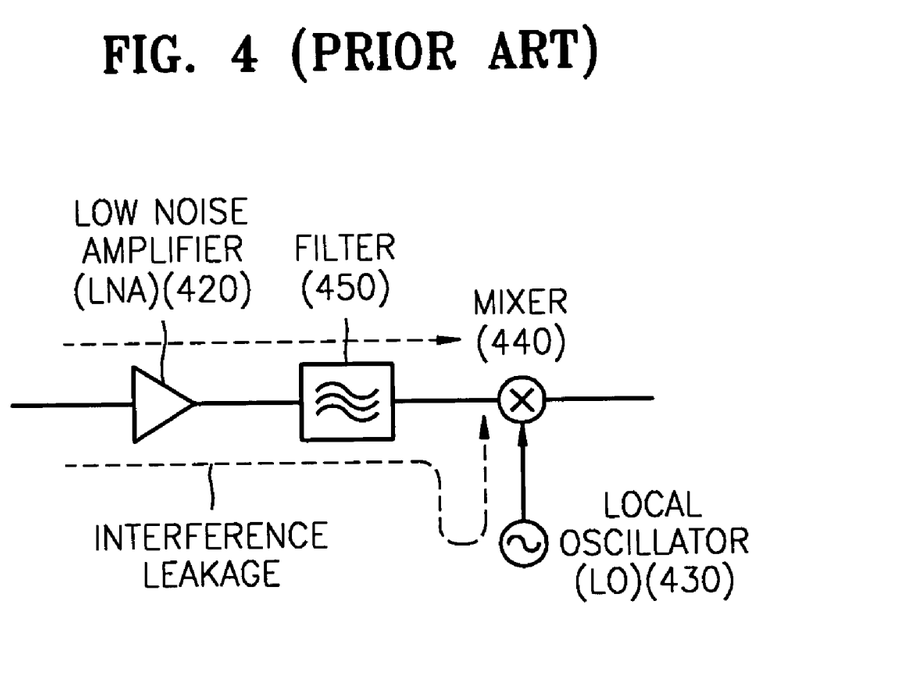
FIG. 4 is a circuit diagram illustrating interference leakage according to the prior art.

FIG. 4 is a diagram illustrating interference leakage according to the prior art. When a strong signal having a frequency level different from that of a local oscillator (LO) 430 is input, frequency leakage occurs in the local oscillator 430, and thus a DC offset signal can be generated in a mixer 440. The DC offset signal damages a signal intended to be demodulated. Similar to FIG. 3, FIG. 4 further includes a low noise amplifier (LNA) 420 and a filter 450.

There are several techniques known in the art to solve the above problem with interference leakage. In pulsed-mode communications using a timeslot, such as GSM, interference leakage is prevented by discharging DC charge when there is no communication service provided. In wireless local area network (LAN) communication, an orthogonal frequency division multiplexing (OFDM) technique, where no signals are loaded in a DC frequency range, is adopted to solve the interference leakage problem. In code division multiple access (CDMA) communication, which uses even more complicated modulation techniques than pulsed-mode communication and wireless LAN communication, a complex self-calibration method is adopted to suppress interference leakage.

In general, a direct conversion receiver (DCR) has two channels, i.e., an I-channel and a Q-channel. The I-channel and the Q-channel each have a mixer, a baseband filter, and a baseband amplifier. Since the elements of the I-channel are not exactly the same as those of the Q-channel, however, they show different gain responses and phase responses in a baseband frequency as compared to counterparts thereof.

Figure 5:
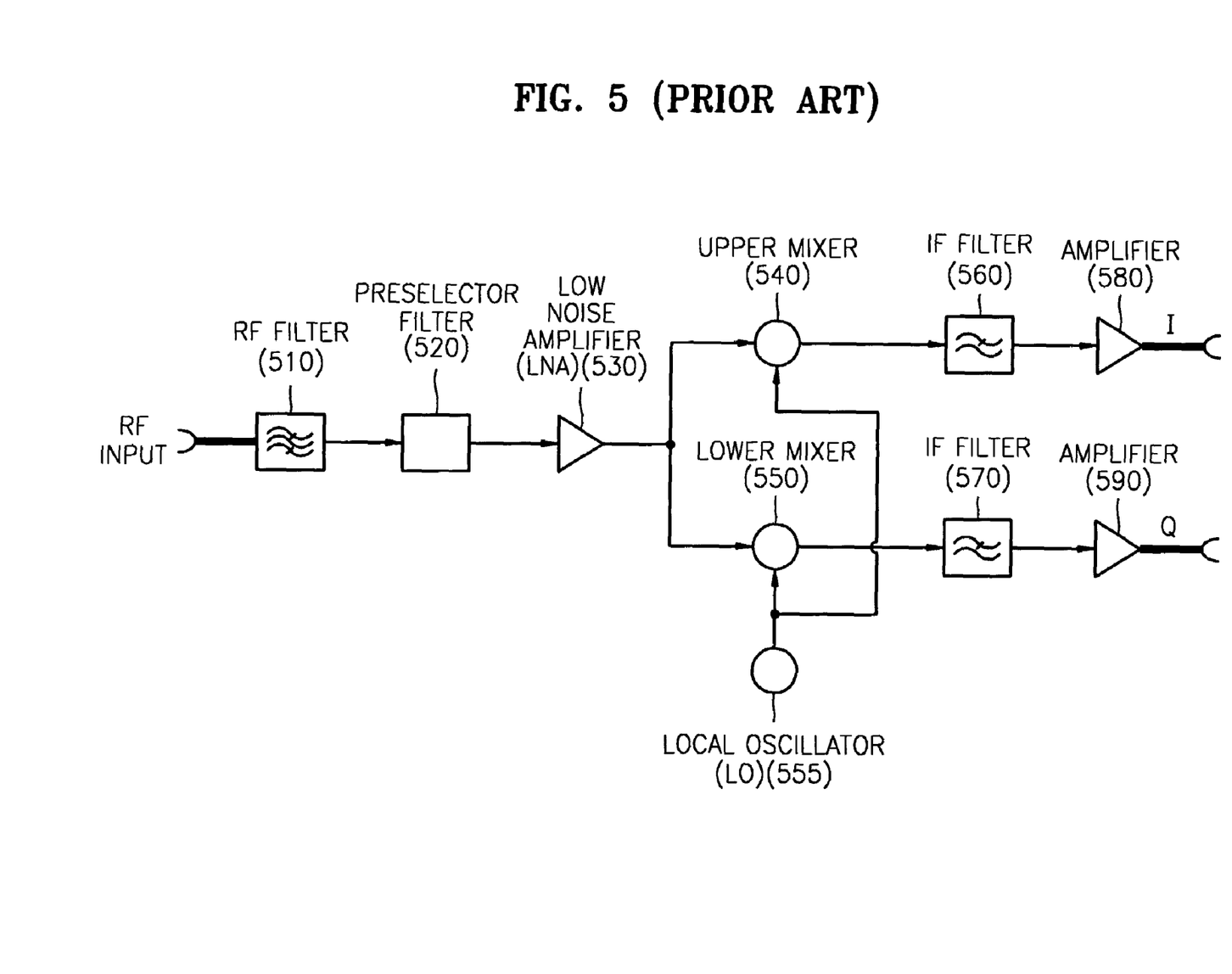
FIG. 5 is a block diagram of a conventional direct conversion receiver.

FIG. 5 is a block diagram of a conventional direct conversion receiver. Referring to FIG. 5, an incoming band pass signal is received at an RF input port and then passed through an RF fliter 510, a preselector filter 520 and a low noise amplifier (LNA) 530. The preselector filter 520 is simply a band pass filter designed to pass a desired signal and to reject spurious out-of-band signals.

After passing through the preselector filter 520 and the low noise amplifier (LNA) 530, the incoming signal is split and sent through an upper mixer 540 and a lower mixer 550. In the upper mixer 540, the corresponding signal is mixed with a sinusoid tuned to the same frequency as a carrier frequency. In the lower mixer 550, the corresponding signal is mixed with the same sinusoid as in the upper mixer 540, but with a phase difference of 90°. The sinusoids are generated by a local oscillator (LO) 555. The upper and lower mixers 540 and 550 produce in-phase and quadrature components, respectively, of the corresponding signal, which are centered at the based band and at twice the carrier frequency. High frequency components are eliminated by filters (e.g., IF filters) 560 and 570, and the in-phase and quadrature signals are finally amplified by amplifiers 580 and 590, respectively, and then become an I-channel signal and a Q-channel signal, respectively.

More particularly, one of the above-described conventional techniques, a super heterodyne receiver, includes many elements. Thus, the super heterodyne receiver is not appropriate for wireless communication terminals, such as mobile phones, because the size of wireless communication terminals has continued to decrease in recent years. In addition, the manufacturing cost of the super heterodyne receiver is high because of the large number of elements constituting the super heterodyne receiver. Moreover, mobile phones have been improved to provide multimedia services as well as voice calls, and the elements thereof or other related circuits have been required to have a smaller size and a more simplified structure. Therefore, there is a limit in adopting the super heterodyne receiver in such wireless communication terminals.

A conventional direct conversion receiver does not include any elements for processing intermediate frequency signals and may be appropriate for mobile phones required to meet the above-described demands. However, manufacturing costs of a communication system using intermediate frequencies is high because the communication system is required to include many elements, including filters, amplifiers, and peripheral circuits, in order to perform intermediate frequency conversion. Specifically, communication techniques need to be capable of directly shifting carrier frequency to baseband frequency or baseband frequency to carrier frequency. However, such direct conversion causes many problems, and thus there is a limit in improving the performance of a communication system adopting direct conversion. More specifically, the conventional direct conversion receiver has a receiver of a simple structure but causes various problems with oscillation, a selectivity level, and a DC offset.

In addition, differences in gains and phase responses between an I-channel and a Q-channel cause mismatches therebetween. The direct conversion receiver cannot completely eliminate an inverse spectrum of an incoming signal due to mismatches between the I-channel and the Q-channel, which causes a significant interference ratio loss. Due to interference ratio loss, a bit error rate increases.

SUMMARY OF THE INVENTION

The present invention provides a direct conversion receiver capable of preventing mismatches between I- and Q-channels.

The present invention also provides a frequency converter operating at a third harmonic of a signal of a local oscillator of the direct conversion receiver.

According to an embodiment of the present invention, a direct conversion receiver includes a local oscillator for generating a sinusoid, a mixer for receiving an incoming signal and for mixing the incoming signal with the sinusoid, an analog-to-digital converter for converting the mixed analog signal into a digital signal, and a digital signal processor for outputting the digital signal so that an I-channel signal and a Q-channel signal are output separately and for transmitting to the local oscillator a phase control signal that determines the phase of a sinusoid to be generated by the local oscillator.

The direct conversion receiver may further include one or more of a low noise amplifier for amplifying the incoming while preventing noise included in the input signal from being amplified, a baseband amplifier for amplifying the mixed analog signal in a baseband, and a baseband low pass filter for removing low frequency noise from a signal amplified by the baseband amplifier.

Preferably, the baseband low pass filter operates at cut-off frequencies at least two times higher than a highest frequency in a spectrum of the incoming signal. Preferably, the baseband low pass filter prevents aliasing at half of the highest frequency in the spectrum of the incoming signal.

The local oscillator may generate a sinusoid having a phase difference of 0° or 30° with the incoming signal in response to the phase control signal transmitted by the digital signal processor. Alternately, the local oscillator may generate a sinusoid having a phase difference of 0° or 90° with the incoming signal in response to the phase control signal transmitted by the digital signal processor.

Preferably, the mixer includes a frequency converter using a Gilbert cell operating at odd harmonics of the local oscillator and having an asymmetric structure. Preferably, the frequency converter operates in response to a third odd harmonic signal of the local oscillator and reduces the number of conversion channels generated in response to even harmonic signals of the local oscillator.

Preferably, the frequency converter includes a first transistor for receiving an RF signal having a phase difference of 0° with the incoming signal, a second transistor for receiving an RF signal having a phase difference of 90° with the incoming signal, a third transistor for receiving a sinusoid generated by the local oscillator and having a phase difference of 0° with the incoming signal is connected to the third transistor, a fourth transistor for receiving a sinusoid generated by the local oscillator and having a phase difference of 0° with the incoming signal is connected to the second transistor, a fifth transistor for receiving a sinusoid generated by the local oscillator and having a phase difference of 180° with the incoming signal is connected to the first transistor, and a sixth transistor for receiving a sinusoid generated by the local oscillator and having a phase difference of 180° with the incoming signal and is connected to the second transistor.

According to another embodiment of the present invention, a direct conversion receiving method includes obtaining a sinusoid using a local oscillator, mixing the sinusoid with an incoming signal, converting the mixed analog signal into a digital signal, and outputting the digital signal so that an I-channel signal and a Q-channel are output separately and transmitting a phase control signal that determines the phase of a sinusoid to be generated to the local oscillator.

The method may further include amplifying the incoming signal and preventing noise included in the incoming signal from being amplified, before obtaining the sinusoid.

The method may further include amplifying the mixed analog signal in a baseband frequency range, and removing low frequency noise from the amplified signal, prior to converting the mixed analog signal into the digital signal.

According to still another embodiment of the present invention, a direct conversion receiving method includes receiving an RF signal and amplifying the RF signal while preventing noise included in the RF signal from being amplified, obtaining a sinusoid from the amplified signal using a local oscillator, mixing the amplified signal with the sinusoid, amplifying the mixed signal in a baseband, removing low frequency noise from the amplified mixed signal, converting the noise-removed analog signal into a digital signal, and outputting the digital signal so that an I-channel signal and a Q-channel are output separately and transmitting a phase control signal that determines the phase of a sinusoid to be generated to the local oscillator.

The method may further include generating a sinusoid having a phase difference of 0° or 30° with the incoming signal in response to the phase control signal or, alternately, may include generating a sinusoid having a phase difference of 0° or 90° with the incoming signal in response to the phase control signal.

The method may further include operating a frequency converter using a Gilbert cell, which operates at odd harmonics of the local oscillator generating sinusoids and has an asymmetric structure, at a third odd harmonic of the local oscillator, and reducing the number of conversion channels generated in response to even harmonic signals of the local oscillator.

Preferably, the removal of the low frequency noise is performed using a baseband low pass filter that operates at cut-off frequencies at least two times higher than a highest frequency in a spectrum of the incoming signal.

According to yet another embodiment of the present invention, there is provided a computer-readable recording medium on which a computer-readable program enabling a direct conversion receiving method according to an embodiment of the present invention is recorded.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

Korean Patent Application No. 2002-53161, filed on Sep. 4, 2002, and entitled: "Time Division IQ Channel Direct Conversion Receiver, and Method Therefor," is incorporated by reference herein in its entirety.

The present invention will now be described more fully hereinafter with reference to the accompanying drawings, in which preferred embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Figure 6A:
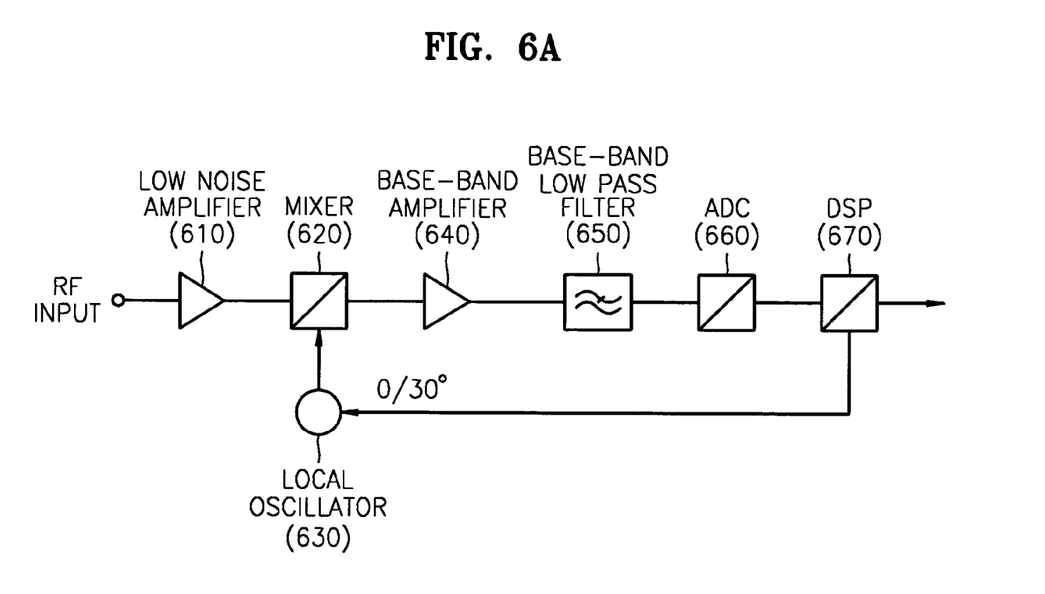
FIG. 6A is a block diagram of a direct conversion receiver according to a preferred embodiment of the present invention.

FIG. 6A is a block diagram of a direct conversion receiver according to a preferred embodiment of the present invention. Referring to FIG. 6A, the direct conversion receiver includes a low noise amplifier (LNA) 610, a mixer 620, a local oscillator (LO) 630, a baseband amplifier 640, a baseband low pass filter 650, an analog-to-digital converter (ADC) 660 for converting analog signals into digital signals, and a digital signal processor (DSP) 670 for separating an I-channel from a Q-channel.

The I- and Q-channels in the present invention are virtual, as opposed to real, because one channel includes both an I-channel signal and a Q-channel signal. The phase of the local oscillator 630 may be switched to 0° or 90° or to 0° or 30°. This switching process must be performed at frequencies two times higher than a highest frequency $F_{spect}$ in a signal spectrum. A switching signal meanders in synchronization with the digital signal processor 670. The analog-to-digital converter 660 performs sampling. The digital signal processor 670 divides data flow obtained as a result of the sampling into I data flow and Q data flow and then processes the I data flow and the Q data flow into an I data stream and a Q data stream. The sampling process performed by the analog-to-digital converter 660 is performed at frequencies higher than $4 \times F_{spect}$.

The low noise amplifier 610 amplifies a signal input thereinto from an RF input while preventing a noise component in the input signal from being amplified.

The mixer 620 synthesizes the amplified RF signal with a sinusoidal signal input from the local oscillator 630.

The local oscillator 630 generates a local frequency signal, i.e., the sinusoidal signal and then supplies the sinusoidal signal to the mixer 620 so that the sinusoidal signal can be combined with the amplified RF signal. In other words, the local oscillator 630 serves as a frequency source for supplying a reference frequency to the mixer 620. The local oscillator 630 generates a sinusoid having a phase difference of 0° or 30° with an input RF signal. Alternatively, the local oscillator 630 may generate a sinusoid having a phase difference of 0° or 90° with the input RF signal. Whether to generate a sinusoid having a phase difference of 0° or 30° with the input RF signal using the local oscillator 630 is determined by a control signal output from the digital signal processor 670, which will be described later in greater detail.

Since the extent to which the input signal is amplified by the low noise amplifier 610 is not sufficient, the baseband amplifier 640 amplifies the input signal amplified by the low noise amplifier 610 within a baseband.

The baseband low pass filter 650 removes low frequency noise from the signal amplified by the baseband amplifier 640. The baseband low pass filter 650 is required to operate at cut-off frequencies at least two times higher than $F_{spect}$. Parameters concerning the cut-off frequency of the baseband low pass filter need to be chosen in consideration of an inter-symbol interference level and a frequency selectivity level. Additional frequency selectivity can be performed by a digital filter for digital processing. The baseband low pass filter 650 is required to be considered a conversion loss in order to prevent an aliasing phenomenon from occurring at a frequency of $F_{spect}/2$.

The analog-to-digital converter 660 converts an analog signal into a digital signal. The digital signal processor 670 then outputs the I-channel signal separately of the Q-channel signal and transmits a phase control signal, which determines the phase of a sinusoid to be generated by the local oscillator 630, to the local oscillator 630. More particularly, since the direct conversion receiver according to the present invention processes the I-channel signal and the Q-channel signal in a time sharing manner, the local oscillator 630 generates sinusoids having a phase difference of 0° with the input signal for a predetermined period of time and then mixes the sinusoids with the input signal. Then, the direct conversion receiver continues to generate sinusoids having a phase difference of 90° with the input signal for a while and then mixes the sinusoids with the input signal for a while. The above-described phase control signal is generated by the digital signal processor 670.

Figure 6B:
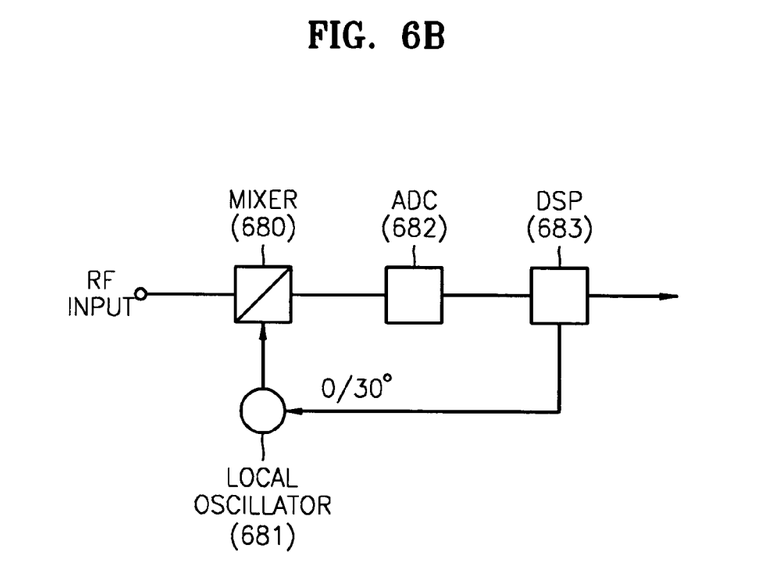
FIG. 6B is a block diagram of a direct conversion receiver according to another preferred embodiment of the present invention.

FIG. 6B is a block diagram of a direct conversion receiver according to another preferred embodiment of the present invention. As shown in FIG. 6B, the direct conversion receiver can be embodied only using several necessary elements, i.e., a mixer 680, a local oscillator 681, an analog-to-digital converter (ADC) 682, and a digital signal processor (DSP) 683. The mixer 680, the local oscillator 681, the analog-to-digital converter 682, and the digital signal processor 683 are the same as their counterparts of the digital conversion receiver shown in FIG. 6A, and thus further description thereof will not be repeated.

Figure 7:
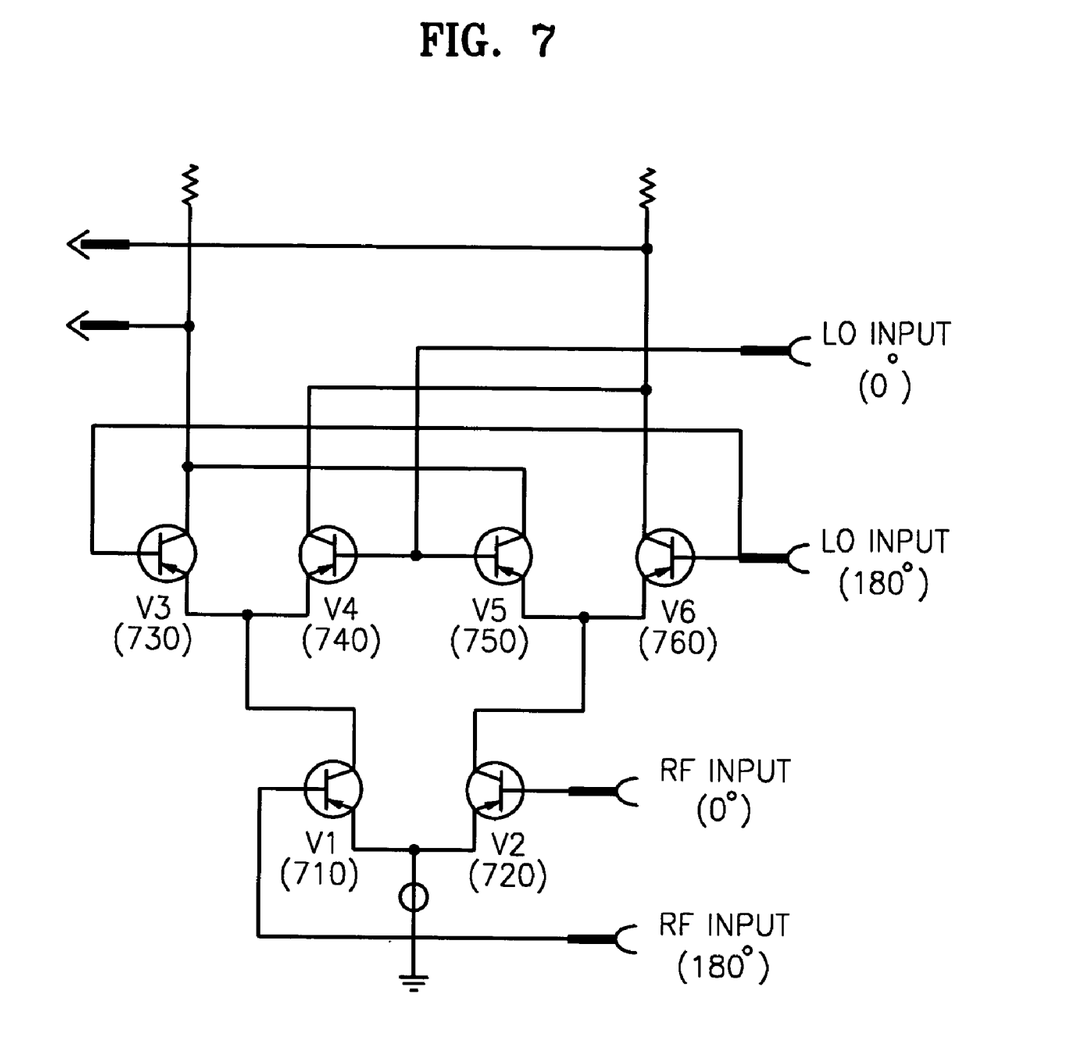
FIG. 7 is a block diagram of a frequency converter in a mixer of a direct conversion receiver according to a preferred embodiment of the present invention.

FIG. 7 is a block diagram of a frequency converter in a mixer of a direct conversion receiver according to a preferred embodiment of the present invention. The frequency converter includes a Gilbert multiplying cell that operates at a third harmonic of a signal of a local oscillator (LO) and brings about suppressed conversion at even harmonics of the local oscillator due to asymmetry of a signal input into the local oscillator.

The frequency converter according to this preferred embodiment of the present invention uses a Gilbert multiplying cell having an asymmetric structure and operating at odd harmonics of the local oscillator. Due to the asymmetric structure, the frequency converter is able to reduce channel signals at odd harmonics of the local oscillator.

Counterphase signals of an RF input with respect to each other are input into transistors V1 (710) and V2 (720). In particular, a 0° phase signal is input into the transistor V2 (720) and a 180° phase signal is input into the transistor V1 (710). Counterphase signals of the local oscillator LO with respect to each other are input into transistors V4 (740) and V5 (750) and transistors V3 (730) and V6 (760). In particular, a 0° phase signal is input into the transistors V4 (740) and V5 (750), and a 180° phase signal is input into the transistors V3 (730) and V6 (760). Due to the asymmetric switching structure of the frequency converter including the transistors V3 (730), V4 (740), V5 (750), and V6 (760), odd harmonics of fundamental current flowing into the bases of the transistors V3 (730), V4 (740), V5 (750), and V6 (760) are generated, and a great conversion gain can be obtained at such odd harmonics while conversion gain at even harmonics of the fundamental current is negligible.

Theoretically, even harmonics of current are rarely generated in the frequency converter. Therefore, conversion gain at such even harmonics is also rare.

The operation and functions of the mixer in the direct conversion receiver according to the present invention including the above-described frequency converter will be described in the following paragraphs.

The direct conversion receiver may operate at odd harmonics of the local oscillator. As the number of harmonics increases, conversion gain continues to decrease. A third harmonic of the local oscillator is preferable. Due to the direct conversion receiver operating at odd harmonics of the local oscillator, it is possible to suppress emission of signals of the local oscillator toward a medium surrounding the local oscillator.

Suppression of conversion gain at even harmonics of the local oscillator results in a small number of spurious channels. In a case where a predetermined harmonic conversion channel does not have any neighboring harmonic conversion channels, for example, in a case where there is a third harmonic conversion channel, second and fourth harmonic conversion channels are not provided and requirements for an RF filter can be simplified.

A 0°-to-90° phase shifter adopting the structure and functions of the frequency converter according to the present invention can be used in designing an IQ mixer.

Figure 8:
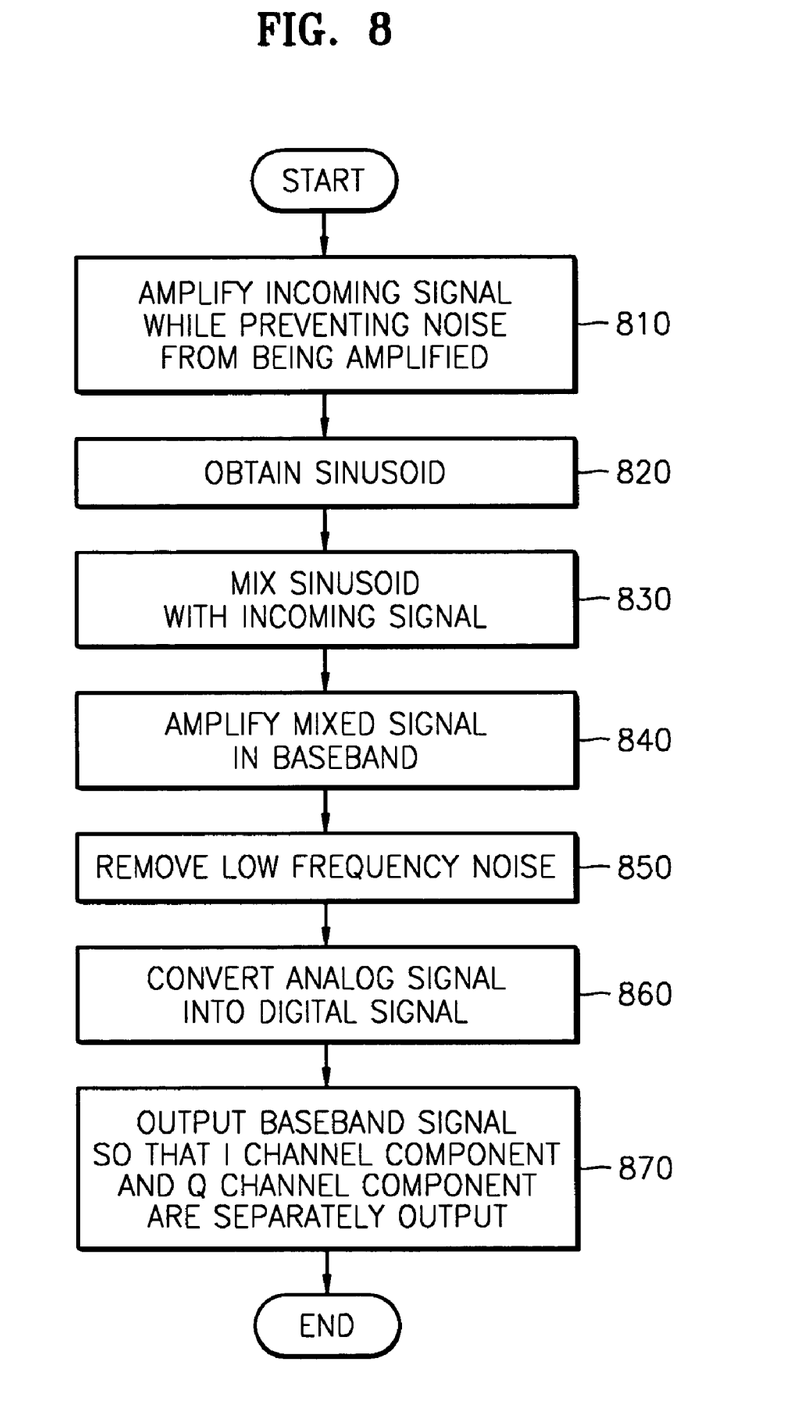
FIG. 8 is a flowchart of a direct conversion reception method according to a preferred embodiment of the present invention.

FIG. 8 is a flowchart of a direct conversion receiving method according to a preferred embodiment of the present invention. Referring to FIG. 8, in step 810, a low noise amplifier amplifies an incoming signal while preventing noise included in the corresponding signal from being amplified. In step 820, a local oscillator generates and outputs a sinusoid to be mixed with the input signal. The generated sinusoid has a phase difference of 0° or 30° with the amplified input signal.

In step 830, a mixer mixes the amplified input signal with the sinusoid input from the local oscillator step 830. Thereafter, in step 840, a baseband amplifier amplifies the result of the mixing in a baseband.

In step 850, a baseband low pass filter removes low frequency noise from the signal amplified by the baseband amplifier. The baseband low pass filter operates at cut-off frequencies at least two times higher than the spectrum frequency $F_{spect}$ of the signal input thereinto. The cut-off frequency of the baseband low pass filter is selected in consideration of an inter-symbol interference level and a selectivity level.

Subsequently, in step 860, an analog-to-digital converter converts the analog signal, from which noise has been removed, into a digital signal.

In step 870, a digital signal processor outputs the digital signal so that an I-channel signal and a Q-channel signal are output separately. Thereafter, the digital signal processor transmits a phase control signal, which determines the phase of a sinusoid to be generated by the local oscillator, to the local oscillator.

Among the steps of the direct conversion receiving method according to this preferred embodiment of the present invention, steps 810, 840, and 850 are not always necessary and thus may be omitted.

The present invention that has been described so far can be embodied in the form of a program that can be executed in a computer using a computer readable recording medium.

The computer-readable recording medium includes a magnetic storage medium, such as a ROM, a floppy disk, or a hard disk; an optical storage medium, such as a CD-ROM or a DVD; and a carrier wave, for example, data transmission through the Internet.

As described above, according to the present invention, it is possible to solve the problem of the prior art with regard to mismatches between I- and Q-channels and provide a high efficiency and yield of a digital system by using a single mixer, a single baseband filter, a single baseband amplifier, a single analog-to-digital converter, and a digital signal processor and adopting direct conversion using a single channel.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A direct conversion receiver, comprising:
   a local oscillator for generating a sinusoid;
   a mixer for receiving an incoming signal and for mixing the incoming signal with the sinusoid;
   an analog-to-digital converter for converting the mixed analog signal into a digital signal; and
   a digital signal processor, the digital signal processor transmitting a phase control signal to the local oscillator and the digital signal processor separately and sequentially outputting an I-channel signal and a Q-channel signal based on the phase control signal, and the digital signal processor setting the phase control signal to a first phase difference, relative to the incoming signal, causing the local oscillator to generate a sinusoid with the first phase difference during a first time period during which the I-channel signal is output and setting the phase control signal to a second phase difference, relative to the incoming signal, causing the local oscillator to generate a sinusoid with the second phase difference during a second time period during which the Q-channel signal is output, wherein the first phase difference is different from the second phase difference and the first time period one of sequentially precedes or follows the second time period.

2. The direct conversion receiver as claimed in claim 1, further comprising:
a low noise amplifier for amplifying the incoming signal while preventing noise included in the incoming signal from being amplified.

3. The direct conversion receiver as claimed in claim 1, further comprising:
a baseband amplifier for amplifying the mixed analog signal in a baseband.

4. The direct conversion receiver as claimed in claim 3, further comprising:
a baseband low pass filter for removing low frequency noise from a signal amplified by the baseband amplifier.

5. The direct conversion receiver as claimed in claim 1, further comprising:
a low noise amplifier for amplifying the incoming signal while preventing noise included in the input signal from being amplified;
a baseband amplifier for amplifying the mixed analog signal in a baseband; and
a baseband low pass filter for removing low frequency noise from a signal amplified by the baseband amplifier.

6. The direct conversion receiver as claimed in claim 4, wherein the baseband low pass filter operates at cut-off frequencies at least two times higher than a highest frequency in a spectrum of the incoming signal.

7. The direct conversion receiver as claimed in claim 4, wherein the baseband low pass filter prevents aliasing at half of the highest frequency in the spectrum of the incoming signal.

8. The direct conversion receiver as claimed in claim 1, wherein one of the first phase difference and the second phase difference is 0° and the other of the first phase difference and the second phase difference is 30°.

9. The direct conversion receiver as claimed in claim 1, wherein one of the first phase difference and the second phase difference is 0° and the other of the first phase difference and the second phase difference is 90°.

10. The direct conversion receiver as claimed in claim 1, wherein the mixer comprises a frequency converter using a Gilbert cell operating at odd harmonics of the local oscillator and having an asymmetric structure.

11. The direct conversion receiver as claimed in claim 10, wherein the frequency converter operates in response to a third odd harmonic signal of the local oscillator and reduces the number of conversion channels generated in response to even harmonic signals of the local oscillator.

12. The direct conversion receiver as claimed in claim 10, wherein the frequency converter comprises:
a first transistor for receiving an RF signal having a phase difference of 0° with the incoming signal;
a second transistor for receiving an RF signal having a phase difference of 180° with the incoming signal;
a third transistor for receiving a sinusoid generated by the local oscillator and having a phase difference of 0° with the incoming signal is connected to the third transistor;
a fourth transistor for receiving a sinusoid generated by the local oscillator and having a phase difference of 0° with the incoming signal is connected to the second transistor;
a fifth transistor for receiving a sinusoid generated by the local oscillator and having a phase difference of 180° with the incoming signal is connected to the first transistor; and
a sixth transistor for receiving a sinusoid generated by the local oscillator and having a phase difference of 180° with the incoming signal and is connected to the second transistor.

13. A direct conversion receiving method, comprising:
obtaining a sinusoid using a local oscillator;
mixing the sinusoid with an incoming signal;
converting the mixed analog signal into a digital signal;
transmitting a phase control signal to the local oscillator; and
separately and sequentially outputting an I-channel signal and a Q-channel signal based on the phase control signal, the phase control signal controlling a phase of the sinusoid being obtained to a first phase difference, relative to the incoming signal, causing the local oscillator to generate a sinusoid with the first phase difference during a first time period during which the I-channel signal is output and setting the phase control signal to a second phase difference, relative to the incoming signal, causing the local oscillator to generate a sinusoid with the second phase difference during a second time period during which the Q-channel signal is output, wherein the first phase difference is different from the second phase difference and the first time period one of sequentially precedes or follows the second time period.

14. The direct conversion receiving method as claimed in claim 13, further comprising:
amplifying the incoming signal and preventing noise included in the incoming signal from being amplified, before obtaining the sinusoid.

15. The direct conversion receiving method as claimed in claim 13, wherein one of the first phase difference and the second phase difference is 0° and the other of the first phase difference and the second phase difference is 30° and obtaining a sinusoid comprises:
generating a sinusoid having a phase difference of 0° or 30° with the incoming signal in response to the phase control signal.

16. The direct conversion receiving method as claimed in claim 13, wherein one of the first phase difference and the second phase difference is 0° and the other of the first phase difference and the second phase difference is 90° and obtaining a sinusoid comprises:
generating a sinusoid having a phase difference of 0° or 90° with the incoming signal in response to the phase control signal.

17. The direct conversion receiving method as claimed in claim 13, wherein obtaining a sinusoid comprises:
operating a frequency converter using a Gilbert cell, which operates at odd harmonics of the local oscillator generating sinusoids and has an asymmetric structure, at a third odd harmonic of the local oscillator; and
reducing the number of conversion channels generated in response to even harmonic signals of the local oscillator.

18. The direct conversion receiving method as claimed in claim 13, wherein prior to converting the mixed analog signal into the digital signal, the method further comprises:
  amplifying the mixed analog signal in a baseband frequency range; and
  removing low frequency noise from the amplified signal.

19. The direct conversion receiving method as claimed in claim 18, wherein the removal of the low frequency noise is performed using a baseband low pass filter that operates at cut-off frequencies at least two times higher than a highest frequency in a spectrum of the incoming signal.

20. A direct conversion receiving method, comprising:
  receiving an RF signal and amplifying the RF signal while preventing noise included in the RF signal from being amplified;
  obtaining a sinusoid from the amplified signal using a local oscillator;
  mixing the amplified signal with the sinusoid;
  amplifying the mixed signal in a baseband;
  removing low frequency noise from the amplified mixed signal;
  converting the noise-removed analog signal into a digital signal; and
  transmitting a phase control signal to the local oscillator; and
  separately and sequentially outputting an I-channel signal and a Q-channel signal based on the phase control signal, the phase control signal controlling a phase of the sinusoid being obtained to a first phase difference, relative to the incoming signal, causing the local oscillator to generate a sinusoid with the first phase difference during a first time period during which the I-channel signal is output and setting the phase control signal to a second phase difference, relative to the incoming signal, causing the local oscillator to generate a sinusoid with the second phase difference during a second time period during which the Q-channel signal is output, wherein the first phase difference is different from the second phase difference and the first time period one of sequentially precedes or follows the second time period.

21. The direct conversion receiving method as claimed in claim 20, wherein one of the first phase difference and the second phase difference is 0° and the other of the first phase difference and the second phase difference is 30° and obtaining a sinusoid comprises:
  generating a sinusoid having a phase difference of 0° or 30° with the incoming signal in response to the phase control signal.

22. The direct conversion receiving method as claimed in claim 20, wherein one of the first phase difference and the second phase difference is 0° and the other of the first phase difference and the second phase difference is 90° and obtaining a sinusoid comprises:
  generating a sinusoid having a phase difference of 0° or 90° with the incoming signal in response to the phase control signal.

23. The direct conversion receiving method as claimed in claim 20, wherein obtaining a sinusoid comprises:
  operating a frequency converter using a Gilbert cell, which operates at odd harmonics of the local oscillator generating sinusoids and has an asymmetric structure, at a third odd harmonic of the local oscillator; and
  reducing the number of conversion channels generated in response to even harmonic signals of the local oscillator.

24. The direct conversion receiving method as claimed in claim 20, wherein the low frequency noise is removed using a baseband low pass filter that operates at cut-off frequencies at least two times higher than a highest frequency in a spectrum of the incoming signal.

25. A computer-readable recording medium on which is a computer-readable program enabling the direct conversion receiving method of claim 13.

26. A computer-readable recording medium on which is a computer-readable program enabling the direct conversion receiving method of claim 20.

* * * * *